United States Patent
Chiu et al.

(10) Patent No.: US 7,876,000 B2
(45) Date of Patent: Jan. 25, 2011

(54) POWER PATH CONTROL CIRCUIT

(75) Inventors: Tzu-Huan Chiu, Chupei (TW);
Kwan-Jen Chu, Hsinchu (TW);
Nien-Hui Kung, HsinChu (TW)

(73) Assignee: Richtek Technology Corporation, Hsin-Chu (TW)

( * ) Notice: Subject to any disclaimer, the term of this patent is extended or adjusted under 35 U.S.C. 154(b) by 199 days.

(21) Appl. No.: 12/383,403

(22) Filed: Mar. 24, 2009

(65) Prior Publication Data

US 2009/0261654 A1    Oct. 22, 2009

(30) Foreign Application Priority Data

Apr. 22, 2008    (TW) .............................. 97206884 U

(51) Int. Cl.
*H01H 9/54*    (2006.01)
(52) U.S. Cl. ..................................................... 307/140
(58) Field of Classification Search .................. 307/140
See application file for complete search history.

(56) References Cited

U.S. PATENT DOCUMENTS 7,251,112 B2 *    7/2007    Fernald ....................... 361/82

* cited by examiner

*Primary Examiner*—Robert L. Deberadinis
(74) *Attorney, Agent, or Firm*—Tung & Associates

(57) ABSTRACT

The present invention provides a power path control circuit comprising: an input node for receiving an external power; a first power transistor electrically connected between the input node and a first node, for controlling power supplied from the input node to the first node; a second power transistor electrically connected between the first node and a battery, for controlling power supplied from the battery to the first node; an error amplifier including an output electrically connected with a gate of the second power transistor, a first input terminal electrically connected with the first node, and a second input terminal electrically connected with the battery, wherein a voltage difference is allocated between the two input terminals.

5 Claims, 2 Drawing Sheets

POWER PATH CONTROL CIRCUIT

BACKGROUND OF THE INVENTION

1. Field of Invention

The present invention relates to a power path control circuit.

2. Description of Related Art

Referring to FIG. 1, a portable electronic device usually has a battery BATT which requires to be charged from an external power supply; the power for example can be received from an adapter or an USB (through an input node). In certain applications, a system may need to operate directly under the external power when the battery is out of charge or when the battery is removed. Therefore, the circuit structure is designed as shown, in which the system can receive power from the adapter or USB, or from the battery BATT. The power path for receiving external power is controlled by a transistor power switch P0, and this switch for example can be controlled by a low drop-out regulator circuit LDO or a switch control circuit 10. The external power can be provided both to the system and the battery BATT, to charge the battery BATT when it is lack of charge. (To simplify the drawing, a control circuit for charging the battery BATT as well as other circuitry non-related to the present invention is omitted in the drawing.)

In the power path from the battery BATT to the system, a power transistor switch P1 is provided, which is controlled by a hysteresis comparator 20. When the system voltage (the voltage at the node A) is lower than the voltage at the node B, the hysteresis comparator 20 generates a low level output to turn on the PMOS transistor P1, so that the battery BATT supplies power to the system. On the other hand, when the voltage at the node A is higher than that at the node B, indicating that the system is acquiring power from the external power supply, the hysteresis comparator 20 generates a high level output to turn off the PMOS transistor P1, so that the battery BATT no more supplies power to the system.

Referring to FIG. 2, in the foregoing prior art, the system operates in three zones Z1-Z3 in terms of where it receives power from. In zone Z1, the system voltage completely comes from the adapter or the USB, since the system voltage level is higher than the battery voltage level. In zone Z3, the system voltage level is far lower than the battery voltage level, so the PMOS transistor P1 is fully turned on. However, in the transition zone Z2 between these two zones, the system voltage level is only slightly lower than the battery voltage level, causing the hysteresis comparator 20 to oscillate between on and off. More specifically, when the system voltage level is lower than the battery voltage level such that the hysteresis comparator 20 switches low, the PMOS transistor P1 is turned on. Yet, the system voltage rises up quickly at this instant because the battery BATT supplies power to the node A after the PMOS transistor P1 is turned on; hence the hysteresis comparator 20 is turned off again because the voltage difference between the node A and the node B changes. Such oscillation repeats until the system voltage reaches the zone Z3 wherein the hysteresis comparator 20 stably turns on the power switch P1.

In view of the foregoing drawbacks, it is desired to provide a power path control circuit which avoids the unstable condition mentioned above.

SUMMARY OF THE INVENTION

An objective of the present invention is to provide a power path control circuit.

In order to achieve the foregoing objective, in one aspect, the present invention provides a power path control circuit for receiving an external power, comprising: an input node for receiving an external power; a first power transistor electrically connected between the input node and a first node, for controlling power supplied from the input node to the first node; a second power transistor electrically connected between the first node and a battery, for controlling power supplied from the battery to the first node; an error amplifier including an output electrically connected with a gate of the second power transistor, a first input terminal electrically connected with the first node, and a second input terminal electrically connected with the battery, wherein a voltage difference is allocated between the two input terminals.

In the foregoing power path control circuit, the first input terminal of the error amplifier can be electrically connected with the first node via a voltage source, wherein the voltage source can be a resistor or a diode. Or, an input voltage offset can be allocated between the two input terminals of the error amplifier.

The objectives, technical details, features, and effects of the present invention will be better understood with regard to the detailed description of the embodiments below, with reference to the drawings.

DESCRIPTION OF THE PREFERRED EMBODIMENTS

Figure 1:
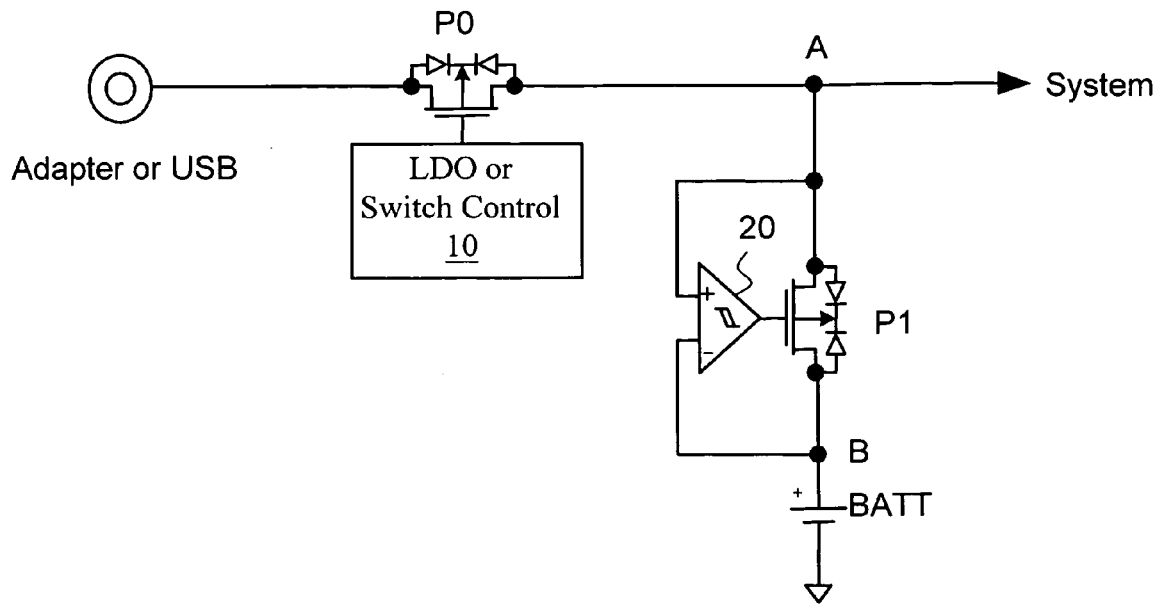
FIG. 1 is a schematic circuit diagram showing a prior art charger circuit.
Figure 2:
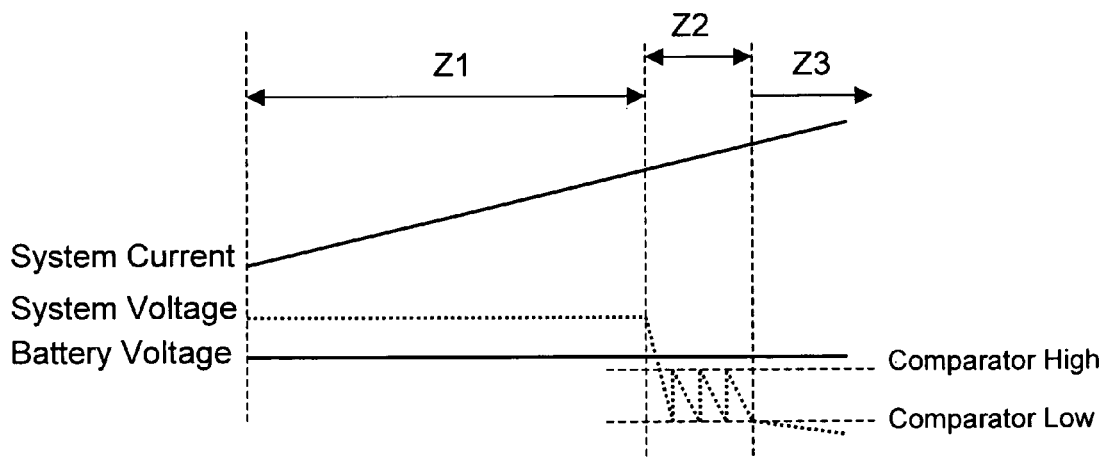
FIG. 2 shows the problem of the prior art in operation.
Figure 3:
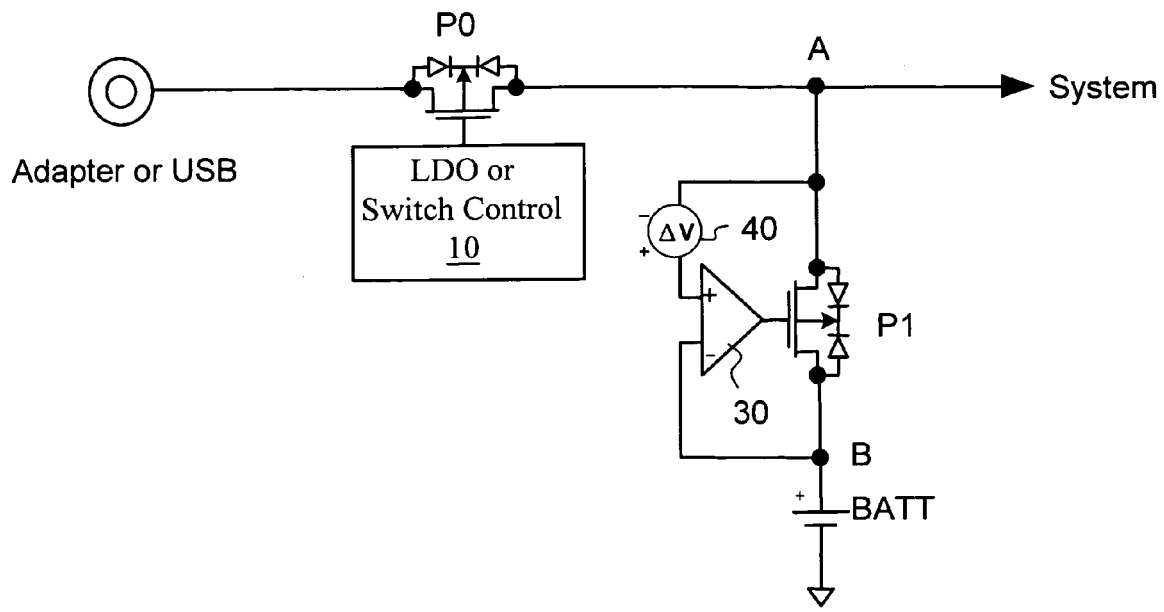
FIG. 3 shows an embodiment of the present invention.

Referring to FIG. 3, the power path control circuit of the present invention uses an error amplifier 30 to control a power transistor P1. An equivalent voltage difference ΔV, represented as a voltage source 40, is provided between two input terminals of the error amplifier 30. The voltage source 40 as shown is only for better illustration of the spirit of the present invention; it does not have to be a physical device. Where it is a physical device, it can be a resistor, a diode or the like. Yet, the voltage source 40 is not limited to a physical device; for example, an input voltage offset between the two input terminals of the error amplifier 30 can also achieve the same effect. Of course, the present invention can also be embodied by providing both the physical device and the input voltage offset between the two input terminals.

Figure 4:
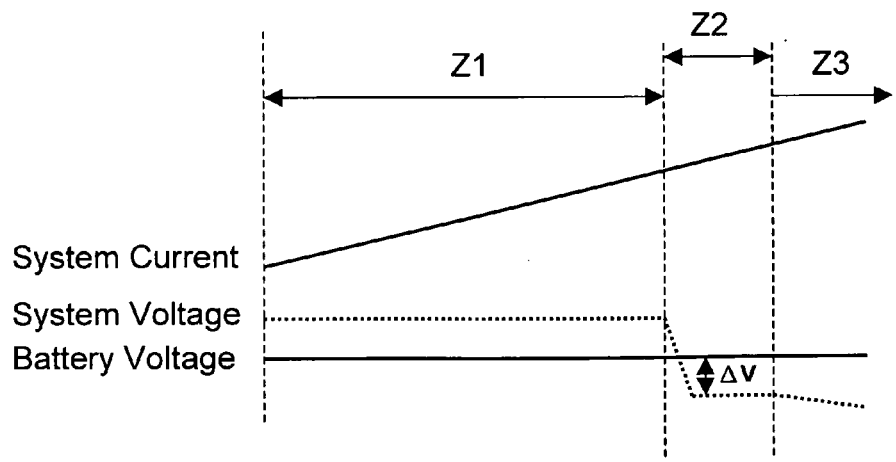
FIG. 4 shows the operation of the present invention.

FIG. 4 shows the operation according to the foregoing circuitry. In zone Z1, the system voltage is totally supplied from the adapter or the USB, because the system voltage is higher than the battery voltage. In the zone Z3, the system voltage is far lower than the battery voltage, so the power transistor P1 is fully turned on. However, in the transition zone Z2 between these two zones, a voltage difference ΔV is maintained between the nodes A and B because of the voltage source 40; in other words, the power transistor P1 is maintained in a stable "partially-on" status. Accordingly, the present invention can solve the foregoing problem of the prior art.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the PMOS transistor of the present invention can be replaced by an NMOS transistor; in this case, the circuit only requires slight modification by interchanging the positive and negative inputs of the error amplifier 30. In view of the foregoing, the spirit of the present invention should cover all such and other modifications and variations, which should be interpreted to fall within the scope of the following claims and their equivalents.

What is claimed is:

1. A power path control circuit comprising:
   an input node for receiving an external power;
   a first power transistor electrically connected between the input node and a first node, for controlling power supplied from the input node to the first node;
   a second power transistor electrically connected between the first node and a battery, for controlling power supplied from the battery to the first node;
   an error amplifier including an output electrically connected with a gate of the second power transistor, a first input terminal electrically connected with the first node, and a second input terminal electrically connected with the battery, wherein a voltage difference is allocated between the two input terminals.

2. The power path control circuit of claim 1, wherein the first input terminal of the error amplifier is electrically connected to the first node via a voltage source.

3. The power path control circuit of claim 2, wherein the voltage source is a resistor or a diode.

4. The power path control circuit of claim 1, wherein an input offset voltage is provided between the two input terminals of the error amplifier.

5. The power path control circuit of claim 1, wherein the first node is electrically connected with a system circuit.

* * * * *